(12) United States Patent
Liaw et al.

(10) Patent No.: US 9,163,178 B2
(45) Date of Patent: Oct. 20, 2015

(54) LIQUID CRYSTAL COMPOUND WITH NEGATIVE DIELECTRIC ANISOTROPY, LIQUID CRYSTAL DISPLAY, AND OPTOELECTRONIC DEVICE

(71) Applicant: INDUSTRIAL TECHNOLOGY RESEARCH INSTITUTE, Hsinchu (TW)

(72) Inventors: Chao-Wu Liaw, New Taipei (TW); Kuo-Chang Wang, Taichung (TW); Jian-Wen Lin, Luzhu Township (TW); Shih-Hsien Liu, Jhubei (TW); Kung-Lung Cheng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/190,709

(22) Filed: Feb. 26, 2014

(65) Prior Publication Data

US 2015/0124210 A1 May 7, 2015

(30) Foreign Application Priority Data

Nov. 5, 2013 (TW) .............................. 102140034 A

(51) Int. Cl.
*C09K 19/30* (2006.01)
*C09K 19/20* (2006.01)
*C09K 19/04* (2006.01)

(52) U.S. Cl.
CPC .............. *C09K 19/20* (2013.01); *C09K 19/3098* (2013.01); *C09K 2019/0466* (2013.01)

(58) Field of Classification Search
CPC .... C09K 19/20; C09K 19/30; C09K 19/3098; C09K 2019/0466
USPC .............. 252/299.01, 299.6, 299.63; 428/1.1; 349/167
See application file for complete search history.

(56) References Cited

U.S. PATENT DOCUMENTS

| | | | |
|---|---|---|---|
| 4,895,672 A | 1/1990 | Goto et al. | |
| 5,236,620 A | 8/1993 | Reiffenrath et al. | |
| 5,279,764 A | 1/1994 | Reiffenrath et al. | |
| 6,482,478 B1 | 11/2002 | Wingen | |
| 6,485,885 B1 | 11/2002 | Oka et al. | |
| 7,226,644 B2 | 6/2007 | Matsumoto et al. | |
| 7,651,629 B2 * | 1/2010 | Takeda | 252/299.6 |
| 7,914,862 B2 | 3/2011 | Masukawa | |
| 8,273,264 B2 | 9/2012 | Jansen et al. | |
| 8,372,306 B2 | 2/2013 | Masukawa | |
| 8,394,293 B2 | 3/2013 | Jansen et al. | |

(Continued)

FOREIGN PATENT DOCUMENTS

| | | |
|---|---|---|
| TW | 484034 B | 4/2002 |
| TW | 200409744 | 6/2004 |
| TW | 200940598 A1 | 10/2009 |
| TW | I346656 | 8/2011 |

OTHER PUBLICATIONS

Bremer et al., "Novel liquid-crystal materials with negative dielectric anisotropy for TV application", Journal of the SID, vol. 14/6, 2006, pp. 517-521.

(Continued)

*Primary Examiner* — Geraldina Visconti
(74) *Attorney, Agent, or Firm* — Birch, Steart, Kolasch & Birch, LLP

(57) ABSTRACT

Disclosed is a liquid crystal compound with negative dielectric anisotropy, having a general formula as Formula 1.

(Formula 1)

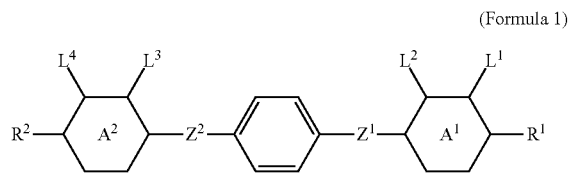

In Formula 1, each of $L^1$, $L^2$, $L^3$, and $L^4$, being same or different, is hydrogen, halogen, or cyano group. Each of $R^1$ and $R^2$, being same or different, is hydrogen, halogen, $C_{1-12}$ alkyl group, $C_{1-12}$ alkoxy group, $C_{1-12}$ haloalkyl group, $C_{2-12}$ alkenyl group, $C_{2-12}$ ether group, or $C_{2-12}$ alkynyl group. Each of $A^1$ and $A^2$, being same or different, is benzene, cyclohexane, or cyclohexene.
$Z^1$ is

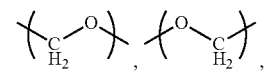

—$CF_2O$—, or —$OCF_2$—, and $Z^2$ is

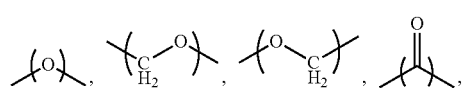

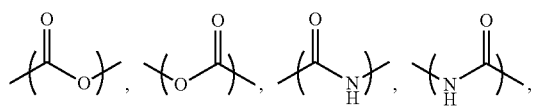

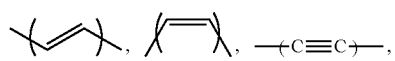

—$CF_2O$—, or —$OCF_2$—.

8 Claims, 1 Drawing Sheet

(56) References Cited

U.S. PATENT DOCUMENTS

| | | |
|---|---|---|
| 2006/0163536 A1 | 7/2006 | Matsumoto et al. |
| 2008/0017830 A1 | 1/2008 | Takeda |
| 2009/0324854 A1 | 12/2009 | Masukawa |
| 2010/0181533 A1 | 7/2010 | Jansen et al. |
| 2011/0037024 A1 | 2/2011 | Kobayashi |
| 2011/0049427 A1 | 3/2011 | Jansen et al. |
| 2012/0001123 A1 | 1/2012 | Jansen et al. |

OTHER PUBLICATIONS

Hird et al., "Nematic materials with negative dielectric anisotropy for display applications", Liquid Crystal Materials, Devices, and Flat Panel Displays, Proceedings of SPIE, vol. 3955, 2000, pp. 15-23.

Lee et al., "Advanced Liquid Crystal Materials with Negative Dielectric Anisotropy for Monitor and TV Applications", Liquid Crystal Materials, Devices, and Applications IX, SPIE, vol. 5003, 2003, pp. 17-24.

Yang et al., "Synthesis and mesomorphic properties of some fluorinated phenyl 4-[(4-n-alkoxyphenyl)ethynyl]benzoates", Liquid Crystals, 2001, vol. 28, No. 10, pp. 1553-1559.

Yin et al., "Synthesis and mesomorphic properties of some novel chiral fluorinated liquid crystals containing a flexible oxymethylene linkage in the core", Liquid Crystals, 1996, vol. 21, No. 2, pp. 217-223.

Taiwanese Office Action and Search Report, dated Jan. 13, 2015, for Taiwanese Application No. 102140034.

* cited by examiner

US 9,163,178 B2

LIQUID CRYSTAL COMPOUND WITH NEGATIVE DIELECTRIC ANISOTROPY, LIQUID CRYSTAL DISPLAY, AND OPTOELECTRONIC DEVICE

CROSS REFERENCE TO RELATED APPLICATIONS

The application is based on, and claims priority from, Taiwan Application Serial Number 102140034, filed on Nov. 5, 2013, the disclosure of which is hereby incorporated by reference herein in its entirety.

TECHNICAL FIELD

The technical field relates to a liquid crystal compound, and in particular to the synthesis and application thereof.

BACKGROUND

Liquid crystal displays (LCD) based on the twisted nematic (TN) mode is the most common type of flat panel display (FPD). Based on the combination of liquid crystals and TFT arrays, the notebook came up in the beginning of the 1990s, and the development of electronics and materials thereof is continued until now. The prerequisite for liquid crystals is a broad nematic phase range of −40 to 100° C. in order to guarantee the so-called operating temperature range of LCDs. The clearing point of a liquid crystal is the temperature at which the liquid crystal phase vanishes. The clearing point must be at least 10° C. higher than the operating temperature of devices. The liquid crystal molecule can be operated in a display device. After a voltage is applied, the liquid crystal molecule is switched to a direction perpendicular to its original direction due to its inherent dielectric anisotropy. For example, after the positive dielectric anisotropic liquid crystal (utilized in general TN mode or IPS mode devices) is applied a driving voltage, a molecular long axis thereof will be influenced by and parallel to an electric field. Contrary to the positive dielectric anisotropic liquid crystal, after the negative dielectric anisotropic liquid crystal (utilized in VA mode devices) is applied a driving voltage, a molecular long axis thereof will be perpendicular to an electric field.

For achieving the above requirements, several papers and patents disclose liquid crystal molecule designs. However, a novel liquid crystal molecule with a more negative dielectric anisotropy and a higher birefringent index is still desired.

SUMMARY

One embodiment of the disclosure provides a liquid crystal compound with negative dielectric anisotropy, having a general formula:

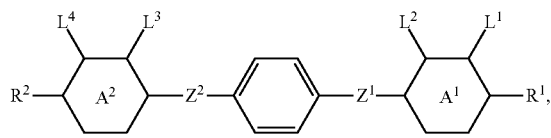

wherein each of $L^1$, $L^2$, $L^3$, and $L^4$, being same or different, is hydrogen, halogen, or cyano group; each of $R^1$ and $R^2$, being same or different, is hydrogen, halogen, $C_{1-12}$ alkyl group, $C_{1-12}$ alkoxy group, $C_{1-12}$ haloalkyl group, $C_{2-12}$ alkenyl group, $C_{2-12}$ ether group, or $C_{2-12}$ alkynyl group; each $A^1$ and $A^2$, being same or different, is benzene, cyclohexane, or cyclohexene; $Z^1$ is

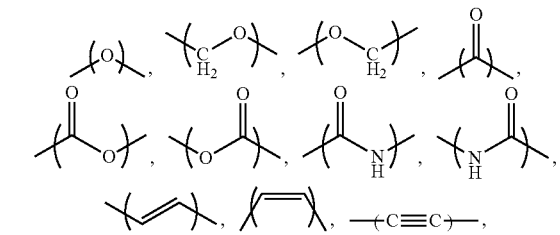

—CF$_2$O—, or —OCF$_2$—; and $Z^2$ is

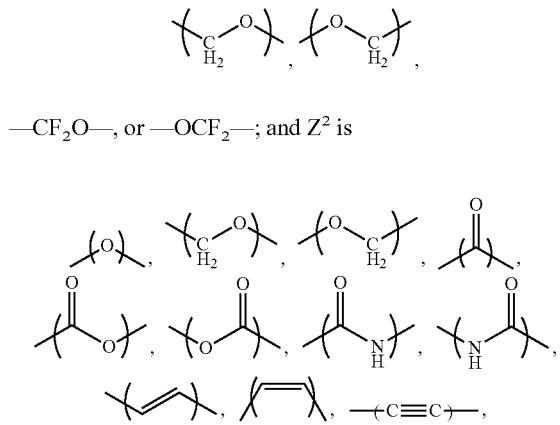

—CF$_2$O—, or —OCF$_2$—.

One embodiment of the disclosure provides a liquid crystal display, comprising: a top substrate; a bottom substrate; and a liquid crystal layer disposed between the top substrate and the bottom substrate; wherein the liquid crystal layer comprises the described liquid crystal compound with negative dielectric anisotropy.

One embodiment of the disclosure provides an optoelectronic device, comprising the described liquid crystal display.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
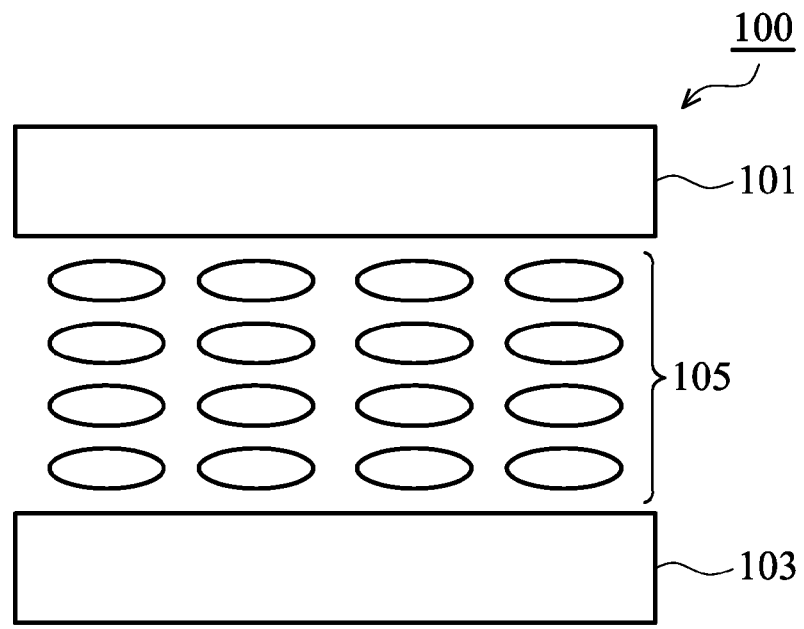
FIG. 1 shows a cross section of an LCD in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides a liquid crystal compound with negative dielectric anisotropy, having a general formula as shown in Formula 1.

(Formula 1)

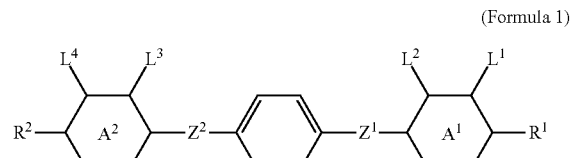

In Formula 1, each of $L^1$, $L^2$, $L^3$, and $L^4$, being same or different, is hydrogen, halogen, or cyano group. Each of $R^1$ and $R^2$, being same or different, is hydrogen, halogen, $C_{1-12}$ alkyl group, $C_{1-12}$ alkoxy group, $C_{1-12}$ haloalkyl group, $C_{2-12}$ alkenyl group, $C_{2-12}$ ether group, or $C_{2-12}$ alkynyl group. Each $A^1$ and $A^2$, being same or different, is benzene, cyclohexane, or cyclohexene.

In Formula 1, $Z^1$ is

$-CF_2O-$, or $-OCF_2-$. $Z^2$ is

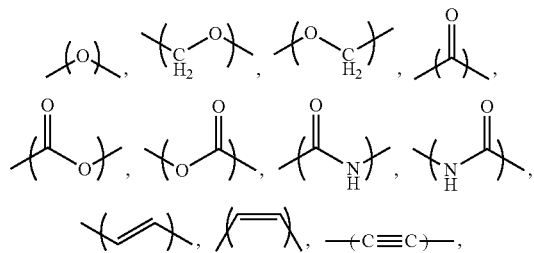

$-CF_2O-$, or $-OCF_2-$.

In some embodiments, $L^1$ and $L^2$ are fluorine, $R^1$ is hydrogen, methoxy group, ethoxy group, propyl group, or butyl group, $R^2$ is hydrogen, methoxy group, ethoxy group, propyl group, or butyl group, $A^1$ is benzene, $A^2$ is benzene or cyclohexene, and $Z^2$ is

The liquid crystal compound may have a general formula as shown in Formulae 2 to 5.

(Formula 2)

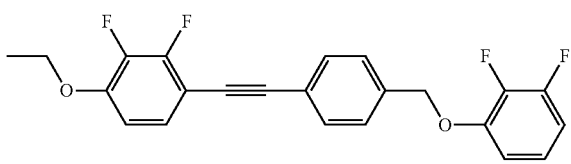

(Formula 3)

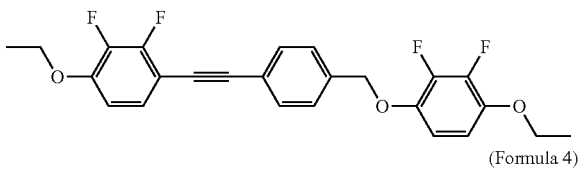

(Formula 4)

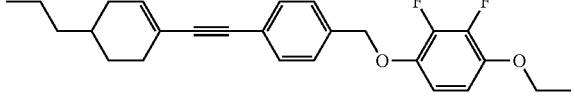

(Formula 5)

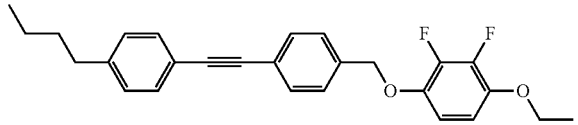

FIG. 1 shows a cross section of an LCD in one embodiment of the disclosure. The LCD 100 includes a top substrate 101 and a bottom substrate 103 and a liquid layer 105 disposed therebetween. In one embodiment, one of the substrates is a color filter substrate and another substrate is an array substrate. In one embodiment, one of the substrates is an array on color filter substrate (AOC) or color filter on array substrate (COA), and another substrate is a transparent substrate such as glass or plastic. The liquid crystal layer 105 includes the liquid crystal compound of the disclosure.

Figure 2:
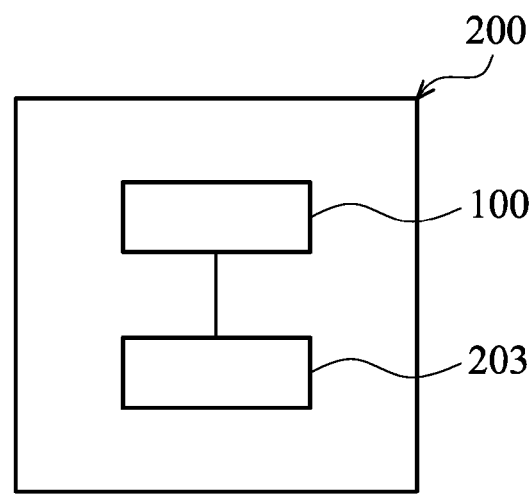
FIG. 2 shows a diagram of an optoelectronic device in one embodiment of the disclosure.

FIG. 2 shows a diagram of an optoelectronic device 200 in an embodiment of the disclosure. Referring to FIG. 2, the LCD panel 100 of the aforementioned embodiments is applied in the optoelectronic device 200 and connected to an electric device 203 such as a control device, operator device, process device, input device, memory device, driving device, illumination device, protection device, other functional devices, or combinations thereof. The optoelectronic device 200 can be a mobile product such as a cell phone, video camera, camera, laptop computer, video game console, watch, music player, E-mail transceiver, electronic map navigation, and the likes. The optoelectronic device 200 can be visual-audio products (such as media players and the like), a monitor, a television, a billboard, a projector, or the likes.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

The raw materials, solvents, or silica gel for chromatography in following organic synthesis were commercially available from fine chemical supply, such as Alfa (Lancaster), TCI, Aldrich, Acros, Merck, and the likes.

The synthesis of the liquid crystal compound is described below, and a series of compounds were completed by 2 to 5 reactions.

The compound spectra and liquid crystal formulae properties and electricity were analyzed by Bruker advance DRX-400 NMR, LC Vision LCAS(I), and Abbe refractometer.

Example 1

100 mmole of 2,3-difluorophenol (compound 1), 2 mL of acetic acid, and 200 mL of dichloromethane were mixed in a reaction bottle and then cooled to $-10°$ C. 110 mL of bromine was then slowly added into the reaction bottle, and the mixture was stirred to react at $-10°$ C. for 1 hour. The residual bromine and the dichloromethane of the reaction result was removed, and the crude was purified by re-crystallization with dichloromethane to obtain a white solid compound 2 (4-bromo-2,3-difluorophenol, yield=82%).

100 mmole of compound 2, 200 mmole of bromoethane, 200 mmole of sodium hydroxide, 1 mmole of tetra-n-butylammonium bromide (TBAB), and 200 mL of water were charged into a reaction bottle and then heated to 70° C. to reflux and react overnight. The reaction result was stood to room temperature, and then extracted by ethyl acetate and water to collect an organic layer thereof. The organic layer was dried by anhydrous magnesium sulfate, and then vacuum-concentrated to obtain a pale yellow liquid 3 (yield=95%). The described reaction is shown in Formula 6.

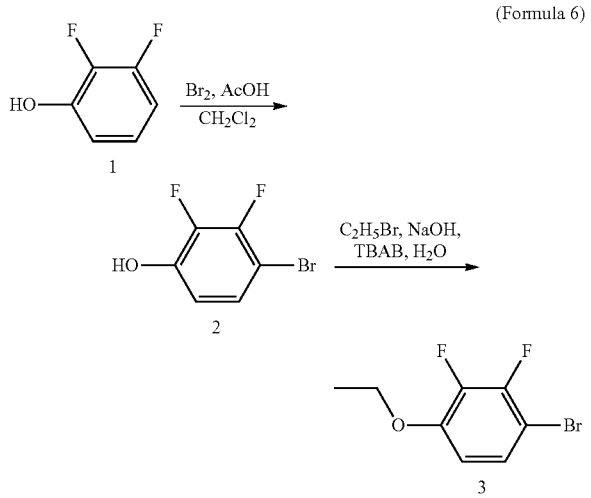

(Formula 6)

20 mmole of the compound 3, 22 mmole of trimethylsilylacetylene, 1 mmole of bis(triphenylphosphine)palladium(II) dichloride, 2 mmole of cuprous iodide, and 2 mmole of triphenylphosphine were charged into a reaction bottle. 20 mL of triethylamine was added into the reaction bottle to serve as a solvent, and the mixture in the reaction bottle was heated to reflux and react for 12 hours under nitrogen. The reaction result was extracted by ethyl acetate and hydrochloric acid aqueous solution 3 times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a compound 4.

15 mmole of compound 4 and 60 mmole of potassium hydroxide were charged into a reaction bottle. 30 mL of tetrahydrofuran (THF) was added into the reaction bottle to serve as a solvent, and the mixture in the bottle was heated to reflux and react for 12 hours. The reaction was quenched by hydrochloric acid aqueous solution. The reaction result was extracted by ethyl acetate and water 3 times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a compound 5. The described reaction is shown in Formula 7.

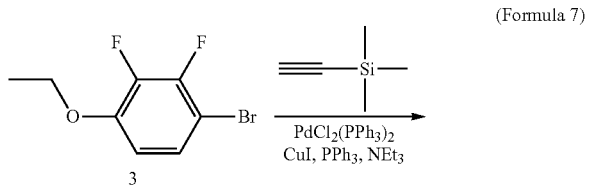

(Formula 7)

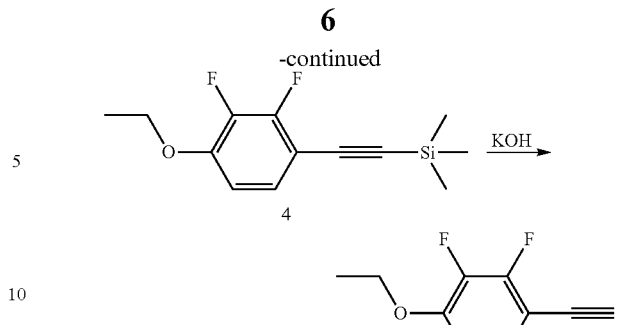

20 mmole of 4-bromobenzylbromide (compound 6), 20 mmole of 2,3-difluorophenol (compound 7), and 40 mmole of sodium hydroxide were charged into a reaction bottle. 40 mL of dimethylformamide (DMF) was added into the reaction bottle to serve as a solvent, and the mixture in the bottle was heated to 100° C. to react at 100° C. for 12 hours. The reaction was quenched by hydrochloric acid aqueous solution. The reaction result was extracted by ethyl acetate and water 3 times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a compound 8. The described reaction is shown in Formula 8.

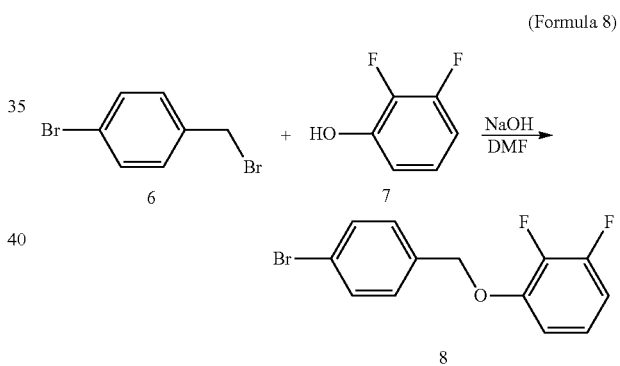

(Formula 8)

10 mmole of compound 8, 10 mmole of compound 5, 0.5 mmole of bis(triphenylphosphine)palladium(II) dichloride, 1 mmole of cuprous iodide, and 1 mmole of triphenylphosphine were charged into a reaction bottle. 20 mL of triethylamine was added into the reaction bottle to serve as a solvent, and the mixture in the reaction bottle was heated to reflux and react for 12 hours under nitrogen. The reaction result was extracted by ethyl acetate and hydrochloric acid aqueous solution 3 times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a white solid product ITRI-1. The described reaction is shown in Formula 9. The compound ITRI-1 had the $^1$H NMR spectrum (400 MHz, CDCl$_3$) of: δ (ppm); 7.57 (d, 2H), 7.43 (d, 2H), 7.2 (t, 1H), 6.95 (m, 1H), 6.81-6.70 (m, 3H), 5.18 (s, 2H), 4.16 (q, 2H), 1.49 (t, 3H). The compound ITRI-1 had a dielectric constant (Δ∈) of −7.74, and a birefringent index (Δn) of 0.297. The liquid crystal compound ITRI-1 was mixed with a liquid crystal mixture Host (as mentioned below) to measure the properties of the mixture, and the dielectric constant ($\Delta\epsilon$) and the birefringent index ($\Delta n$) of the liquid crystal compound ITRI-1 were calculated by extrapolation.

(Formula 9)

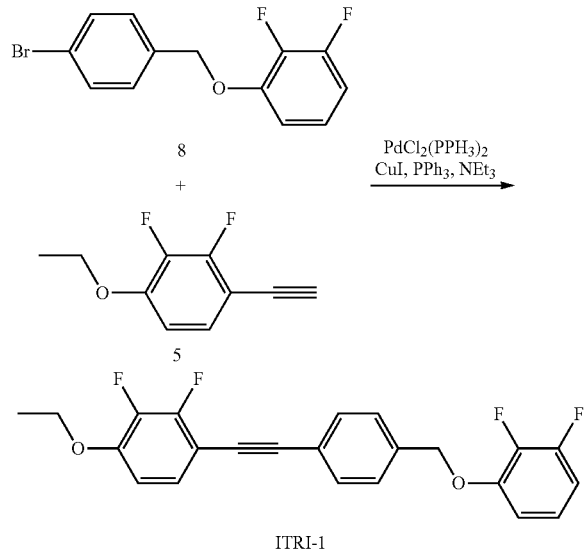

Example 2

50 mmole of the pale yellow liquid 3 and 50 mL of anhydrous THF were charged into a reaction bottle under nitrogen. The reaction bottle was cooled to −78° C., 50 mmole of n-butyl lithium was slowly added into the reaction bottle at −78° C., and the reactants were stirred at −78° C. for 2 hours. 60 mmole of trimethylborate was then added into the reaction bottle, and the mixture in the reaction bottle was then stirred for further 30 minutes. The reaction temperature was back to room temperature, and the reaction was then quenched by hydrochloric acid aqueous solution. The reaction result was extracted by ethyl acetate and water 3 times to collect an organic layer thereof. The organic layer was dried by anhydrous magnesium sulfate, and then vacuum-concentrated to obtain a crude. The crude was purified by re-crystallization with n-heptane and toluene to obtain a white solid boride 9.

40 mmole of boride 9 and 40 mmole of oxone were charged into a reaction bottle. 40 mL of water was added into the reaction bottle to serve as a solvent, and the mixture in the reaction bottle was then stirred at room temperature for 4 hours. The reaction was quenched by hydrochloric acid aqueous solution. The reaction result was extracted by ethyl acetate and water to collect an organic layer thereof. The organic layer was dried by anhydrous magnesium sulfate, and then vacuum-concentrated to obtain a product 10. The described reaction is shown in Formula 10.

(Formula 10)

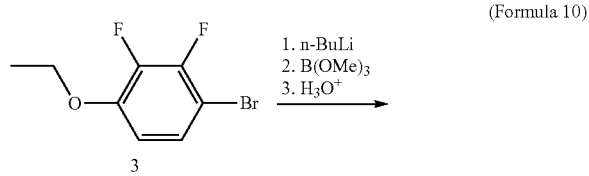

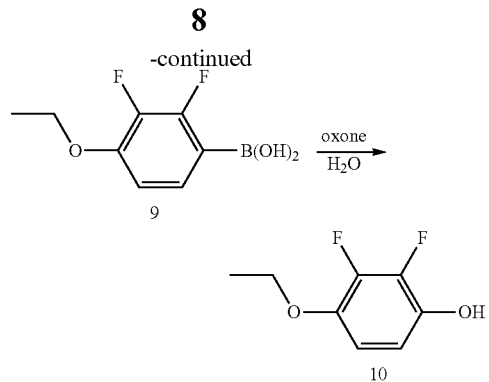

20 mmole of 4-bromobenzyl bromide (compound 6), 20 mmole of compound 10, and 40 mmole of sodium hydroxide were charged into a reaction bottle. 40 mL of DMF was then added into the reaction bottle to serve as a solvent, and the mixture in the reaction bottle was heated to 100° C. to react at 100° C. for 12 hours. The reaction was quenched by hydrochloric acid aqueous solution. The reaction result was extracted by ethyl acetate and water for three times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a white solid compound 11. The described reaction is shown in Formula 11.

(Formula 11)

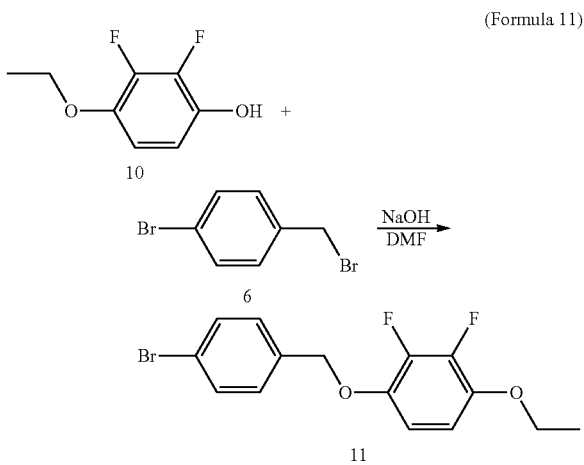

10 mmole of compound 11, 10 mmole of compound 5, 0.5 mmole of bis(triphenylphosphine)palladium(II) dichloride, 1 mmole of cuprous iodide, and 1 mmole of triphenylphosphine were charged into a reaction bottle. 20 mL of triethylamine was added into the reaction bottle to serve as a solvent, and the mixture in the reaction bottle was heated to reflux and react for 12 hours under nitrogen. The reaction result was extracted by ethyl acetate and hydrochloric acid aqueous solution 3 times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a white solid product ITRI-2. The described reaction is shown in Formula 12. The compound ITRI-2 had the $^1$H NMR spectrum (400 MHz, CDCl$_3$) of: $\delta$ (ppm); 7.55 (d, 2H), 7.41 (d, 2H), 7.20 (t, 1H), 6.71 (t, 1H), 6.63 (m, 2H), 5.10 (s, 2H), 4.15

(q, 2H), 4.05 (q, 2H), 1.48 (t, 3H), 1.42 (t, 3H). The compound ITRI-2 had a dielectric constant (Δ∈) of −12.34, and a birefringent index (Δn) of 0.297. The liquid crystal compound ITRI-2 was mixed with a liquid crystal mixture Host (as mentioned below) to measure the properties of the mixture, and the dielectric constant (Δ∈) and the birefringent index (Δn) of the liquid crystal compound ITRI-2 were calculated by extrapolation.

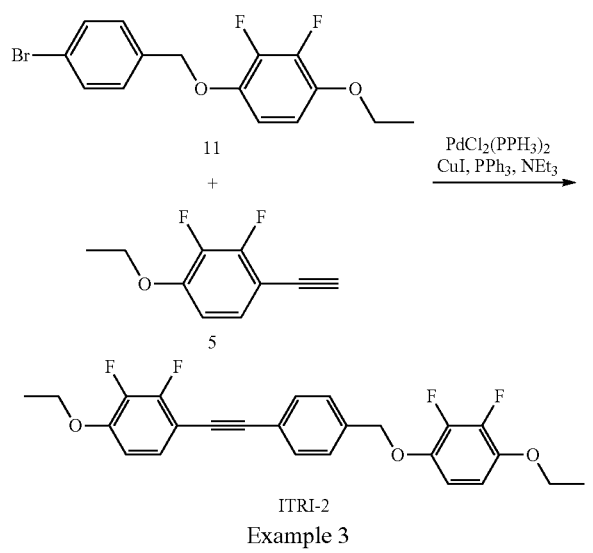

(Formula 12)

ITRI-2

Example 3

30 mmole of trimethylsilyl ethyne and 30 mL of anhydrous THF were charged into a reaction bottle under nitrogen, and then cooled to −78° C. 30 mmole of n-butyl lithium was added into the reaction bottle and stirred at −78° C. for 1 hour. 30 mmole of 4-propylcyclohexanone (compound 12) was then added into the reaction bottle, and the bottle temperature was back to room temperature. The mixture was reacted for 4 hours at room temperature, and the reaction was then quenched by hydrochloric acid aqueous solution. The reaction result was extracted by ethyl acetate and water 3 times to collect an organic layer thereof. The organic layer was dried by anhydrous magnesium sulfate, and then vacuum-concentrated to obtain a crude 13.

The crude 13, 10 mol % of p-toluenesulfonic acid (PTSA), and 50 mL of toluene were charged into a reaction bottle, and then heated to reflux and react for 4 hours. The reaction result was extracted by ethyl acetate and hydrochloric acid aqueous solution 3 times to collect an organic layer thereof. The organic layer was dried by anhydrous magnesium sulfate, and then vacuum-concentrated to obtain a crude. The crude was purified by chromatography, with a column of silica gel and an eluent of n-hexane, to obtain a pale yellow liquid compound 14.

10 mmole of the compound 14 and 30 mmole of potassium hydroxide were charged into a reaction bottle. 20 mL of THF was added into the reaction bottle to serve as a solvent, and the mixture in the reaction bottle was heated to reflux and react for 6 hours. The reaction was quenched by hydrochloric acid aqueous solution. The reaction result was extracted by ethyl acetate and water 3 times to collect an organic layer thereof. The organic layer was dried by anhydrous magnesium sulfate, and then vacuum-concentrated to obtain a crude. The crude was purified by chromatography, with a column of silica gel and an eluent of n-hexane, to obtain a pale yellow liquid compound 15. The described reaction is shown in Formula 13.

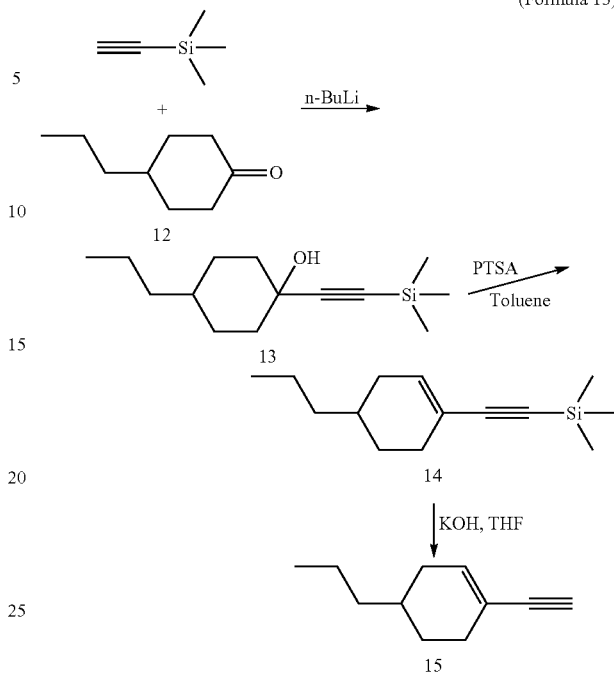

(Formula 13)

10 mmole of the compound 11, 10 mmole of the compound 15, 0.5 mmole of bis(triphenylphosphine)palladium(II) dichloride, 1 mmole of cuprous iodide, and 1 mmole of triphenylphosphine were charged into a reaction bottle. 20 mL of triethylamine was added into the reaction bottle to serve as a solvent, and the mixture in the reaction bottle was heated to reflux and react for 12 hours. The reaction result was extracted by ethyl acetate and hydrochloric acid aqueous solution 3 times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a white solid product ITRI-3. The described reaction is shown in Formula 14. The compound ITRI-3 had the $^1$H NMR spectrum (400 MHz, CDCl$_3$) of: δ (ppm); 7.42 (d, 2H), 7.34 (d, 2H), 6.60 (m, 2H), 6.19 (s, 1H), 5.07 (s, 2H), 4.5 (q, 2H), 2.7 (m, 3H), 1.81 (m, 2H), 1.44 (t, 3H), 1.40-1.25 (m, 5H), 0.91 (t, 3H). The compound ITRI-3 had a dielectric constant (Δ∈) of −5.62, and a birefringent index (Δn) of 0.249. The liquid crystal compound ITRI-3 was mixed with a liquid crystal mixture Host (as mentioned below) to measure the properties of the mixture, and the dielectric constant (Δ∈) and the birefringent index (Δn) of the liquid crystal compound ITRI-3 were calculated by extrapolation.

(Formula 14)

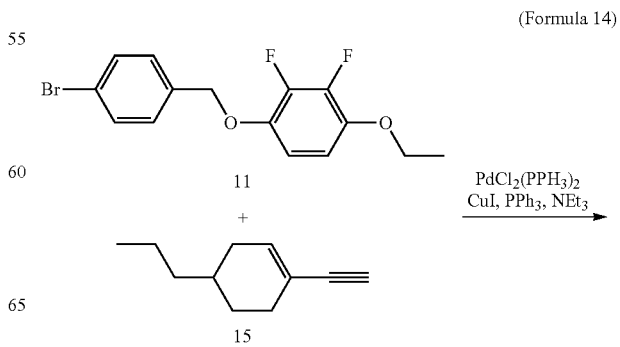

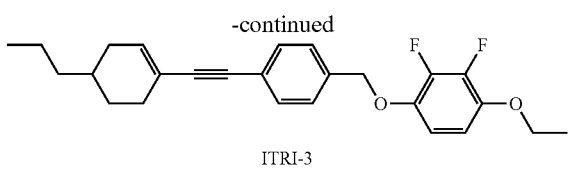

ITRI-3

Example 4

20 mmole of the compound 16, 22 mmole of the trimethylsilyl ethyne, 1 mmole of bis(triphenylphosphine)palladium (II) dichloride, 2 mmole of cuprous iodide, and 2 mmole of triphenylphosphine were charged into a reaction bottle. 40 mL of triethylamine was added into the reaction bottle to serve as a solvent, and the mixture in the reaction bottle was heated to reflux and react for 12 hours under nitrogen. The reaction result was extracted by ethyl acetate and hydrochloric acid aqueous solution 3 times to collect an organic layer thereof. The organic layer was dried by anhydrous magnesium sulfate, and then vacuum-concentrated to obtain a crude. The crude was purified by chromatography, with a column of silica gel and an eluent of n-hexane, to obtain a pale yellow liquid compound 17.

15 mmole of the compound 17 and 45 mmole of potassium hydroxide were charged into a reaction bottle. 30 mL of THF was added into the reaction bottle to serve as a solvent, and the mixture in the reaction bottle was heated to reflux and react for 10 hours. The reaction was neutralized by hydrochloric acid aqueous solution. The reaction result was extracted by ethyl acetate and water 3 times to collect an organic layer thereof. The organic layer was dried by anhydrous magnesium sulfate, and then vacuum-concentrated to obtain a crude. The crude was purified by chromatography, with a column of silica gel and an eluent of n-hexane, to obtain a crude compound 18. The described reaction is shown in Formula 15.

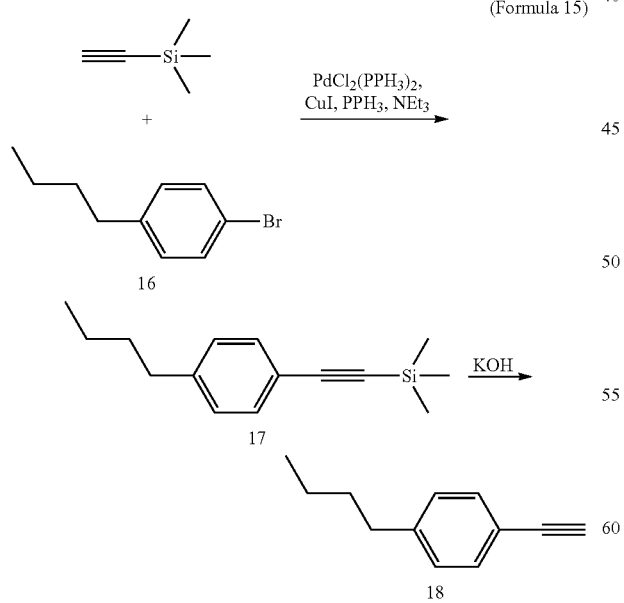

(Formula 15)

10 mmole of the compound 11, 10 mmole of the compound 18, 0.5 mmole of bis(triphenylphosphine)palladium(II) dichloride, 1 mmole of cuprous iodide, and 1 mmole of triphenylphosphine were charged into a reaction bottle. 20 mL of triethylamine was added into the reaction bottle to serve as a solvent, and the mixture in the reaction bottle was heated to reflux and react for 12 hours under nitrogen. The reaction result was extracted by ethyl acetate and hydrochloric acid aqueous solution 3 times to collect an organic layer thereof. The organic layer was dried by anhydrous magnesium sulfate, and then vacuum-concentrated to obtain a crude. The crude was purified by chromatography, with a column of silica gel and an eluent of ethyl acetate and n-hexane (1:10), to obtain a white solid product ITRI-4. The described reaction is shown in Formula 16. The compound ITRI-4 had the $^1$H NMR spectrum (400 MHz, CDCl$_3$) of: δ (ppm); 7.53 (d, 2H), 7.44 (d, 2H), 7.39 (d, 2H), 7.17 (d, 2H), 6.62 (m, 2H), 5.10 (s, 2H), 4.05 (q, 2H), 2.62 (t, 2H), 1.58 (m, 2H), 1.42 (t, 3H), 1.37 (m, 2H), 0.94 (t, 3H). The compound ITRI-4 had a dielectric constant ($\Delta \varepsilon$) of −7.34, and a birefringent index ($\Delta n$) of 0.291. The liquid crystal compound ITRI-4 was mixed with a liquid crystal mixture Host (as mentioned below) to measure the properties of the mixture, and the dielectric constant ($\Delta \varepsilon$) and the birefringent index ($\Delta n$) of the liquid crystal compound ITRI-4 were calculated by extrapolation.

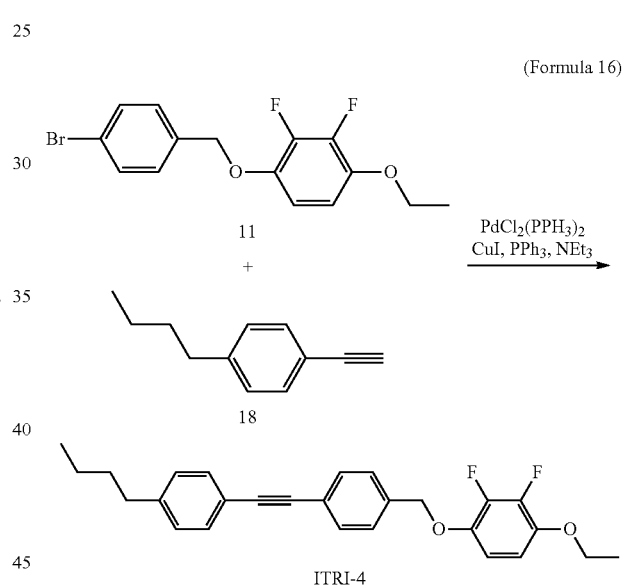

(Formula 16)

Example 5

Commercially available liquid crystal compounds were formulated to form a liquid crystal mixture (Host). Composition ratios of the Host are tabulated in Table 1.

TABLE 1

| Structure | wt % |
|---|---|
| H$_7$C$_3$—⬡—⬡—C$_2$H$_5$ | 15 wt % |
| H$_7$C$_3$—⬡—⬡—C$_5$H$_{11}$ | 13 wt % |

TABLE 1-continued

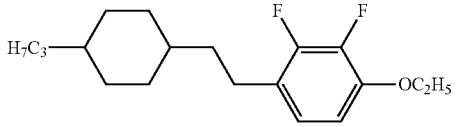 25 wt %

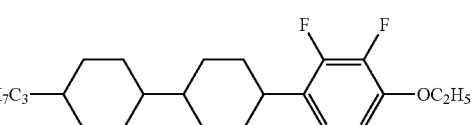 12 wt %

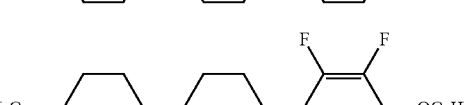 8 wt %

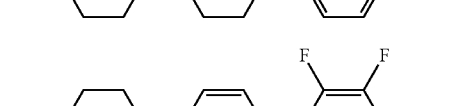 17 wt %

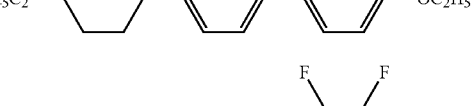 10 wt %

Different weight ratios of the described liquid crystal compound with negative dielectric anisotropy, ITRI-1, ITRI-2, ITRI-3, and ITRI-4, and the liquid crystal mixture Host were mixed. The mixtures had excellent dielectric constants ($\Delta\varepsilon$) and birefringent indexes ($\Delta n$), as shown in Table 2.

TABLE 2

|  | Host | ITRI-1 | ITRI-2 | ITRI-3 | ITRI-4 |
|---|---|---|---|---|---|
| Compound additive amount (wt %) | 0 | 2.5 | 1 | 7.5 | 5 |
| $\Delta\varepsilon$ | −2.54 | −2.67 | −2.64 | −2.77 | −2.78 |
| $\Delta n$ | 0.097 | 0.102 | 0.099 | 0.109 | 0.109 |

Comparative Example 1

5 parts by weight of a liquid crystal compound C-1 in Formula 17 (referring to patent DE 3906019A1) and 95 parts by weight of the liquid crystal mixture Host were mixed to form a mixture. The liquid crystal properties of the mixture are shown in Table 3. As shown in comparison of Table 3, the liquid crystal mixture containing the compound ITRI-4 had better dielectric constants ($\Delta\varepsilon$) and birefringent indexes ($\Delta n$) than that of the liquid crystal mixture containing the liquid crystal compound C-1.

(Formula 17)

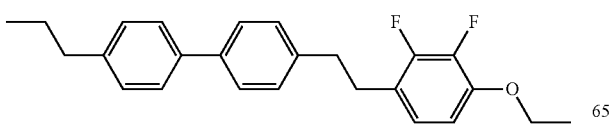

TABLE 3

|  | Host | ITRI-4 | C-1 |
|---|---|---|---|
| Monomer additive amount (wt %) | 0 | 5 | 5 |
| $\Delta\varepsilon$ | −2.54 | −2.78 | −2.64 |
| $\Delta n$ | 0.097 | 0.109 | 0.104 |

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A liquid crystal compound with negative dielectric anisotropy, having a general formula:

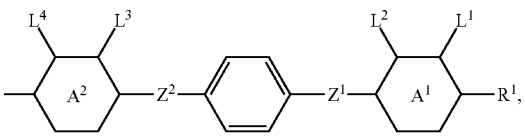

wherein each of $L^1$, $L^2$, $L^3$, and $L^4$, being same or different, is hydrogen, halogen, or cyano group;

each of $R^1$ and $R^2$, being same or different, is hydrogen, halogen, $C_{1-12}$ alkyl group, $C_{1-12}$ alkoxy group, $C_{1-12}$ haloalkyl group, $C_{2-12}$ alkenyl group, $C_{2-12}$ ether group, or $C_{2-12}$ alkynyl group;

each $A^1$ and $A^2$, being same or different, is benzene, cyclohexane, cyclohex-1-ene, cyclohex-2-ene, or cyclohex-3-ene;

$Z^1$ is

—CF$_2$O—, or —OCF$_2$—; and $Z^2$ is

2. The liquid crystal compound with negative dielectric anisotropy as claimed in claim 1, wherein:

$L^1$ and $L^2$ are fluorine;

$R^1$ is hydrogen, methoxy group, ethoxy group, propyl group, or butyl group;

$R^2$ is hydrogen, methoxy group, ethoxy group, propyl group, or butyl group;

$A^1$ is benzene;

$A^2$ is benzene cyclohex-1-ene, cyclohex-2-ene, or cyclohex-3-ene.

3. The liquid crystal compound with negative dielectric anisotropy as claimed in claim 1, having a general formula:

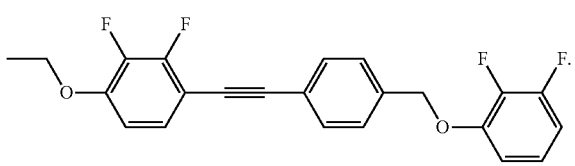

4. The liquid crystal compound with negative dielectric anisotropy as claimed in claim 1, having a general formula:

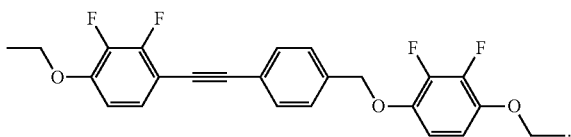

5. The liquid crystal compound with negative dielectric anisotropy as claimed in claim 1, having a general formula:

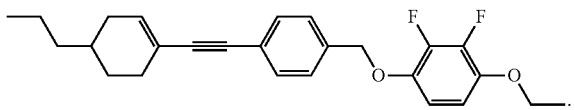

6. The liquid crystal compound with negative dielectric anisotropy as claimed in claim 1, having a general formula:

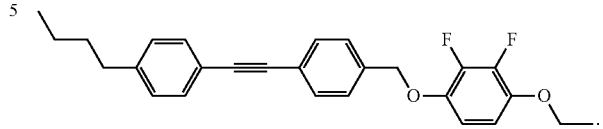

7. A liquid crystal display, comprising:
a top substrate;
a bottom substrate; and
a liquid crystal layer disposed between the top substrate and the bottom substrate;
wherein the liquid crystal layer comprises the liquid crystal compound with negative dielectric anisotropy as claimed in claim 1.

8. An optoelectronic device, comprising the liquid crystal device as claimed in claim 7.

* * * * *